United States Patent
Rudeen

(12) United States Patent (10) Patent No.: US 6,522,441 B1
(45) Date of Patent: Feb. 18, 2003

(54) MICRO-OPTICAL SYSTEM FOR AN AUTO-FOCUS SCANNER HAVING AN IMPROVED DEPTH OF FIELD

(75) Inventor: Robert W. Rudeen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/724,933

(22) Filed: Nov. 28, 2000

(51) Int. Cl.⁷ .............................................. G02B 26/08
(52) U.S. Cl. ....................... 359/196; 359/210; 359/223; 250/201.2; 235/462.23
(58) Field of Search .................................. 359/196–226, 359/17, 19, 739–742, 900; 250/201.2, 201.4, 234–236; 235/462.22, 462.23, 462.31, 462.32, 462.35, 462.36, 462.42, 462.43

(56) References Cited

U.S. PATENT DOCUMENTS

| | | | |
|---|---|---|---|
| 4,808,804 A | * | 2/1989 | Krichever et al. |
| 5,187,353 A | | 2/1993 | Metlitsky et al. |
| 5,202,784 A | | 4/1993 | Reddersen |
| 5,656,805 A | | 8/1997 | Plesko |
| 5,870,219 A | | 2/1999 | Plesko |
| 5,880,452 A | | 3/1999 | Plesko |
| 5,945,670 A | | 8/1999 | Rudeen |
| 6,036,098 A | | 3/2000 | Goldman et al. |
| 6,092,728 A | | 7/2000 | Li et al. |

* cited by examiner

*Primary Examiner*—James Phan
(74) *Attorney, Agent, or Firm*—Stoel Rives LLP

(57) ABSTRACT

A micro-optical system with autofocus capability utilizing micro electro-mechanical systems (MEMS) to vary the focus of the beam achieving increased depth of field and improved poor quality reading. The disclosed micro-optical system includes a light source, a micro-optical element positioned adjacent the light source, a detector configured to provide detection information based at least in part on a location of an object, a processor configured to calculate and transmit, and an actuator configured to adjust the relative spacing of the micro-optical element and the light source based at least n part on the actuation information received. In another embodiment, end-user or OEM focus is disclosed wherein the scanner is varied by altering the focus parameters input by the user. In this embodiment, the focus parameters are dependent on the application for which the scanner is to be used. For example, the device may be configured to have a very small "waist" or "spot" to read extremely small barcodes for applications where space for barcode labels is limited or where barcodes are deliberately made unobtrusive. Similarly, a methods of use of the present invention are also disclosed.

39 Claims, 6 Drawing Sheets

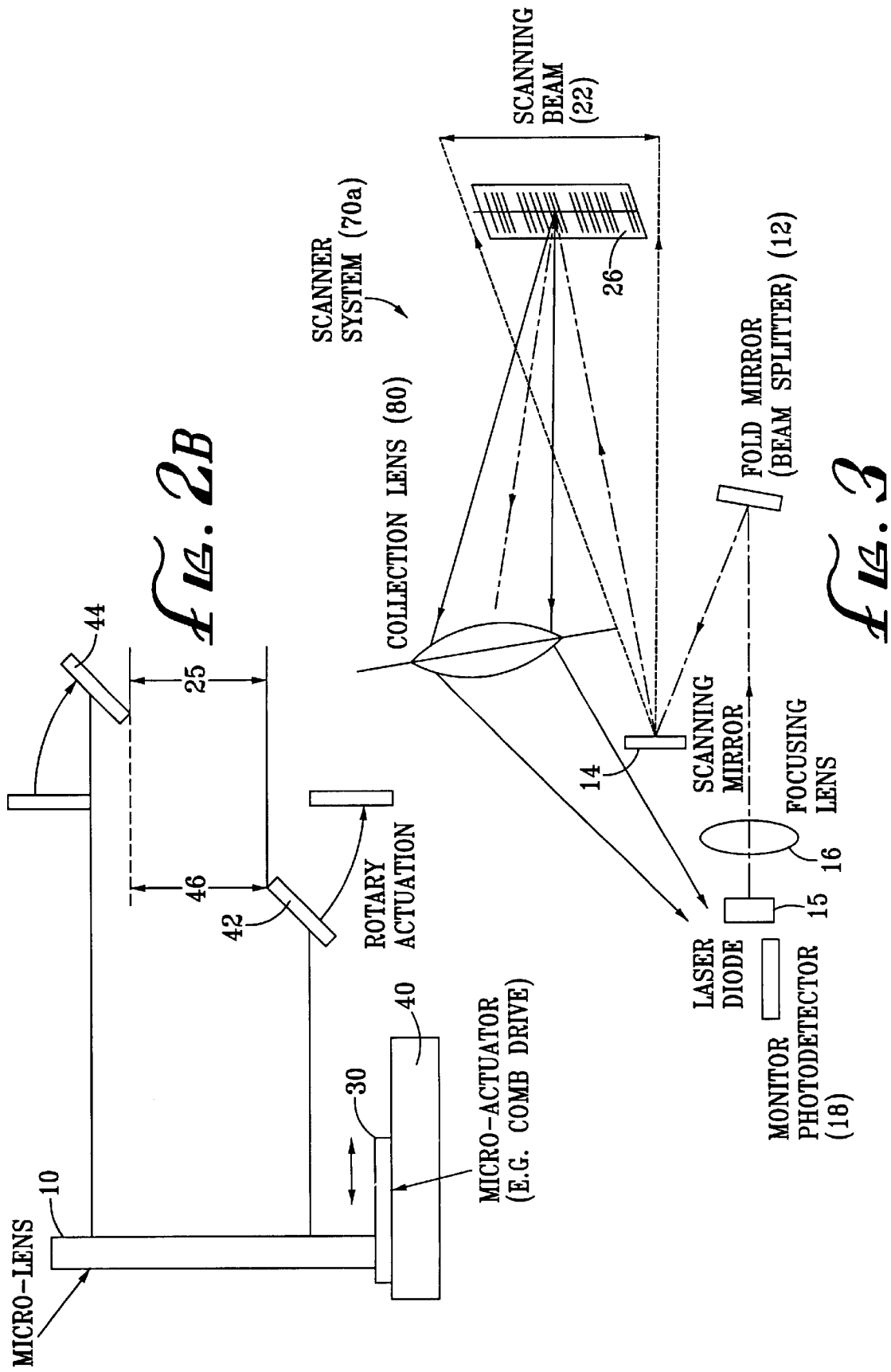

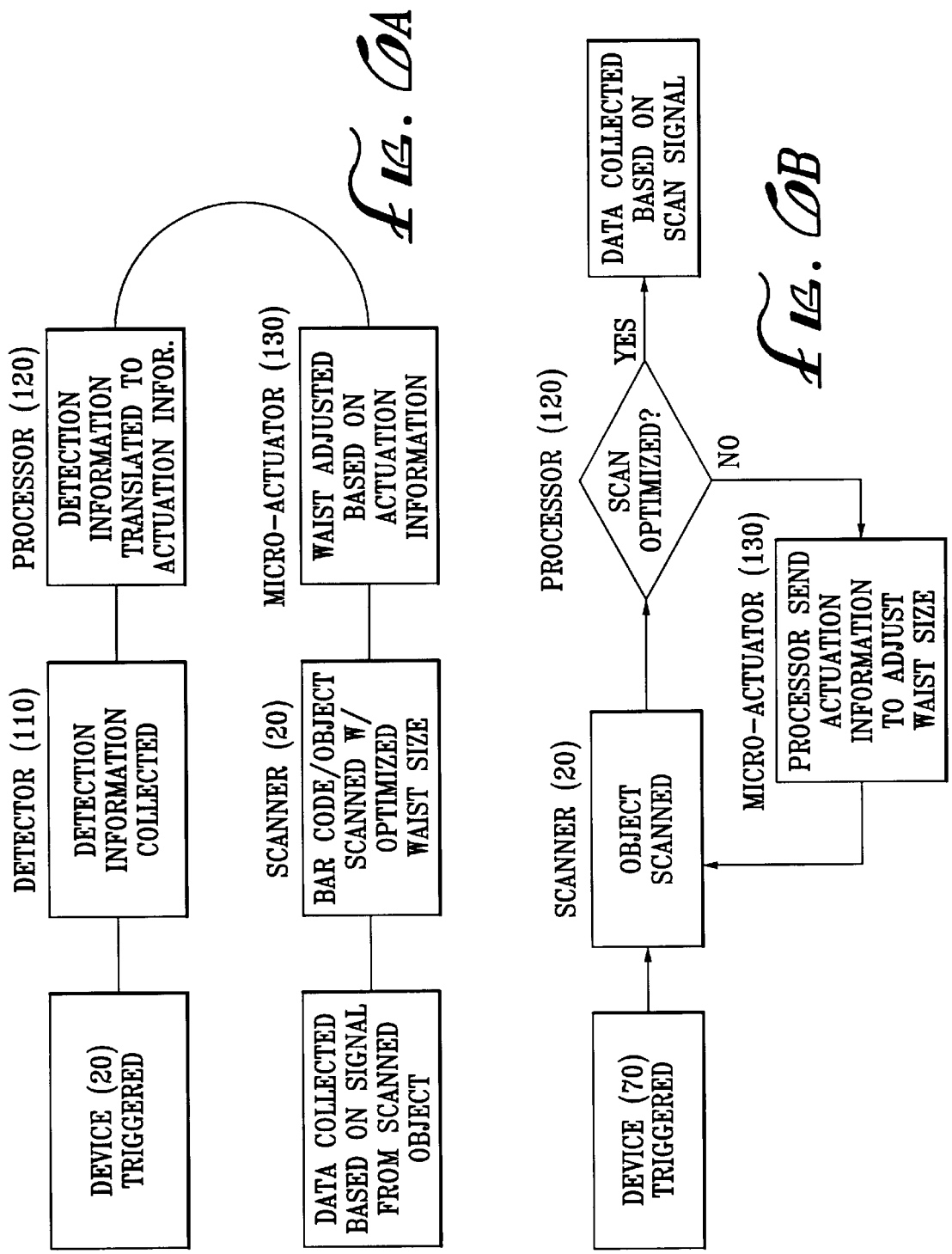

MICRO-OPTICAL SYSTEM FOR AN AUTO-FOCUS SCANNER HAVING AN IMPROVED DEPTH OF FIELD

BACKGROUND OF THE INVENTION

The field of the present invention relates to data reading systems, and particularly to an optical system for reading bar codes such as found on consumer products (i.e. a UPC code), the system having improved depth of field and focusing through incorporation of micro electro-mechanical systems. The system is suitable for a variety of stationary or handheld scanners.

Bar code scanners, as any optical system, depend upon focused optics for effective and accurate performance. In a detection system such as a bar code scanning device employing a focusing lens, a light source such as a laser, laser diode, or non-coherent light source (e.g., light emitting diode) emits light which passes through and is focused by the focusing lens. The object containing the bar code is passed through the focused beam and if the bar code is sufficiently close to the beam focal point, reflected light from the bar code may be detected resulting in a successful scan. Specifically, the detected light reflected from the bar code is read by the scanner that then creates a signal based on the characteristics of the detected light. Because different barcodes create reflected light having different and unique characteristics, which are detectable by the scanner system, it is possible to assign data to a specific barcode based on the signal produced by the reflected light from the barcode.

As known by one skilled in the art, a focal point is typically not a discrete point but may be referred to as a "waist" which is the position along the beam axis where the "cone" of light from the light source reaches a minimum spot size, usually as measured in a direction parallel to the direction of spot motion.

A problem arises when the bar code or object being scanned does not fall sufficiently close to the focal point or waist, that is, when the beam spot is too large or too small to successfully read a symbol. By way of example, in a supermarket checkout application, a product bearing a UPC bar code label is passed at a certain distance in front of the window of a checkout scanner. The checkout scanner is designed with a scanning beam with a waist of a given diameter positioned at a certain distance from the window where the bar code is expected to pass. The checkout clerk must become familiar with the proper distance to pass the object in front of the window, that is, the bar code must pass sufficiently close to the scanner focal point or waist (i.e. within its depth of field) in order to achieve a successful scan.

However, in some applications, it may be desirable for the scanning device to function over a range of distances. U.S. Pat. No. 5,945,670 to Rudeen et al. discloses a variable aperture device that is electronically controllable for selectively adjusting the waist location of the outgoing beam. U.S. Pat. No. 5,438,187 to Rudeen et al. discloses using a laser beam to different distances via a focusing lens having multiple zones. U.S. Pat. Nos. 5,770,847 and 5,814,803 to Olmstead disclose image readers systems with multi-focus lenses. In systems as disclosed in U.S. Pat. No. 4,818,886, the position of the detector or the light source itself is moved—changing the object distance.

Another attempt at providing multiple depths of field is described in U.S. Pat. No. 4,560,862 which uses a rotatable optical polygon mirror having a plurality of facets, each mirror facet being of a different curvature. As the polygon mirror rotates, a different mirror facet reflects the beam from the light source along an optical path, each mirror facet providing a corresponding focal plane. The device multiplexes the signal to read the signal received from the various focal planes. Since the rotating polygon mirror also scans the outgoing beam, the device may also not be readily compatible with existing scanner designs and only allows a certain number of discrete focal points (one focal point for each mirror facet). Moreover, changing between selected sets of focal points would require replacing mirror facets or making some other hardware adjustment or modification.

Accordingly, the present inventor has recognized the desirability for a system for actively focusing a data reader/scanner which can change the focus parameters at low power and nearly instantaneously as the scanner reads the bar code.

SUMMARY OF THE INVENTION

The present invention is directed to a focusing system and method of focusing for a data reader, in a preferred configuration comprising a micro-optical system.

In a preferred application, the focusing system can vary the optimum waist focus distance as the bar code symbol is read in order to maintain an optimum focus and reduce or eliminate "false" reads or non-reading of the bar code symbol because the waist was either too small or too large. Furthermore, the focusing system may include a micro-optical system which utilizes advanced technology in order to make the scanner extremely compact so that the device is easily fabricated and suitable for use with such devices as pen scanners, hand scanners, wrist-mounted scanning devices, and other applications where it is desirable to have an extremely compact, robust scanning device. In one embodiment, the system comprises a scanning device that is mounted on a silicon substrate using micro-electromechanical systems (MEMS) technology.

Another embodiment comprises a scanner having an adjustable focus which could be varied "in the field" for optimum performance in a variety of applications. In this way, the scanner is varied by altering the focus parameters input by the user, wherein the focus parameters are dependent on the application for which the scanner is to be used. For example, the device may be configured to have a very small "waist" or "spot" to read extremely small barcodes for applications where-space for barcode labels is limited or where barcodes are deliberately made unobtrusive. Alternatively, for applications where the barcode label is of poor quality, the scanner may be configured to have a large waist or spot size in order to resolve voids or ambiguities in the barcode.

In an alternative embodiment, a focusing system comprises a focus aperture that may be nearly instantaneously varied through the use of an electronic actuator. In this manner, the focus aperture is widened or narrowed to optimize for a variety of bar sizes. Such a configuration is particularly suitable for applications where there are voids in printed bars in that a large waist size better integrates over these voids and increases the accuracy of the scanner.

BRIEF DESCRIPTION OF THE FIGURES

FIGS. 2A–2B show a scanning system according to an alternate embodiment wherein an adjustable aperture is used to alter the waist size of a scanning beam, wherein FIG. 2A illustrates a linearly adjustable aperture for controlling the waist size of a scanning beam and FIG. 2B illustrates a rotationally adjustable aperture for controlling the waist size of a scanning beam.

FIG. 3 is a schematic of a preferred scanner apparatus suitable for application with the preferred embodiments.

FIGS. 4A–4B schematically illustrate the variation in waist size of a scanning beam from a scanner system, wherein FIG. 4A shows the alteration in waist size as one moves farther downstream the scanning beam and FIG. 4B shows the alteration in waist size relative to the configuration of FIG. 4A when the micro-lens and light source are moved closer relative to each other.

FIGS. 6A–6B are flow charts graphically illustrating steps involved in a scanning method according to a preferred embodiment, wherein FIG. 6A shows the steps involved in the operation of a scanner system including a detector and processor and FIG. 6B shows an alternate method in a scanning system which does not require a detector and includes an optimization feedback loop.

FIGS. 7A–7B show a comb-drive actuator suitable for use with a preferred embodiment wherein FIG. 7A shows the comb-drive actuator in "closed" configuration and FIG. 7B shows the comb-drive actuator in a spaced "open" configuration.

DETAILED DESCRIPTION OF THE PREFERRED EMBODIMENTS

The preferred embodiments will now be described with reference to the attached figures. As used herein, "downstream" refers to a location farther away from the light source while "upstream" refers to a location closer to the light source.

Figure 1:
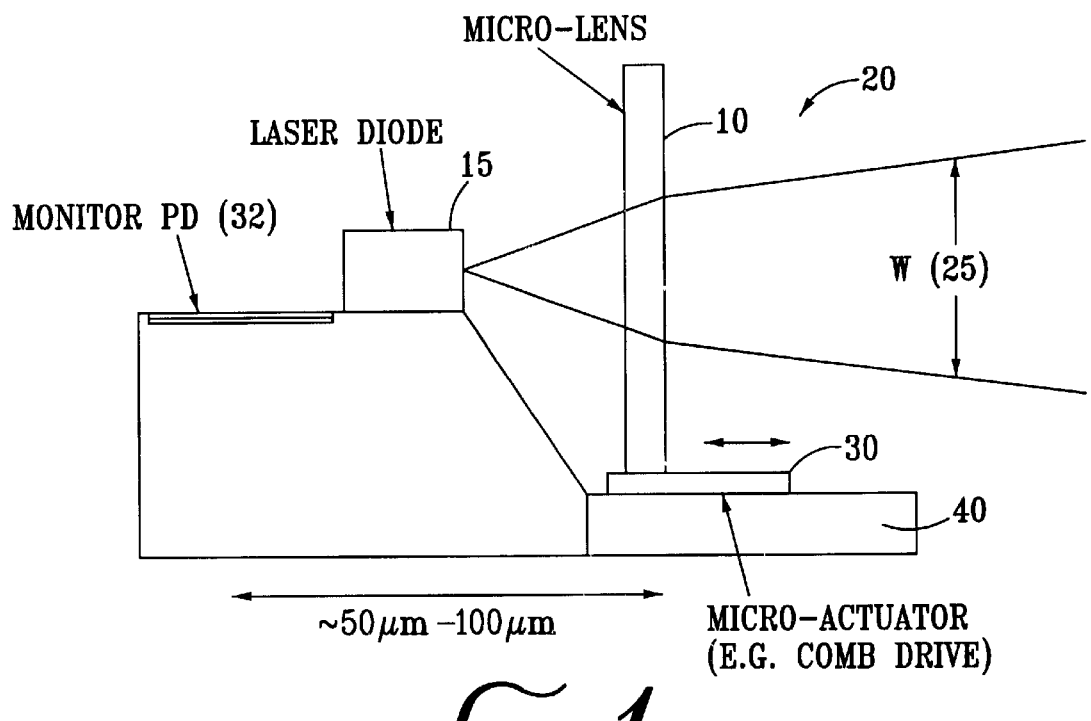
FIG. 1 is a scanning system according to a first embodiment wherein relative movement of a light source and a micro-lens is used to alter the waist size of a scanning beam.

FIG. 1 is a schematic of a scanner system 20 according to a first embodiment comprising a light source 15 disposed such that light emitted therefrom is incident a micro-optical element comprising a micro-lens 10. Although the invention is described with reference to a micro-lens 10, it can be understood that a variety of micro-optical elements are suitable for this application, including, for example, a curved micro-mirror, gradient index lenses, binary optical elements, or diffractive optical elements such as micro-holographic elements. In a preferred embodiment, the light source 15 is a laser diode, however, the system 20 is suitable for use with various light sources, including: a coherent light source such as a laser or laser diode, a non-coherent light source such as a light emitting diode, or combinations thereof. Furthermore, the micro-lens 10 may be comprised of one or more optical elements selected from the group consisting of: spherical, Fresnel and aspheric lenses or mirrors, holographic optical elements, and combinations thereof. Alternatively, a micro-optical element may comprise a curved micro-mirror or a micro-holographic element instead of micro-lens 10. Although, for simplicity, the preferred embodiments will be described using a micro-optical element comprising a micro-lens 10, the systems are generally applicable using alternate micro-optical elements as described above.

Figure 7A:
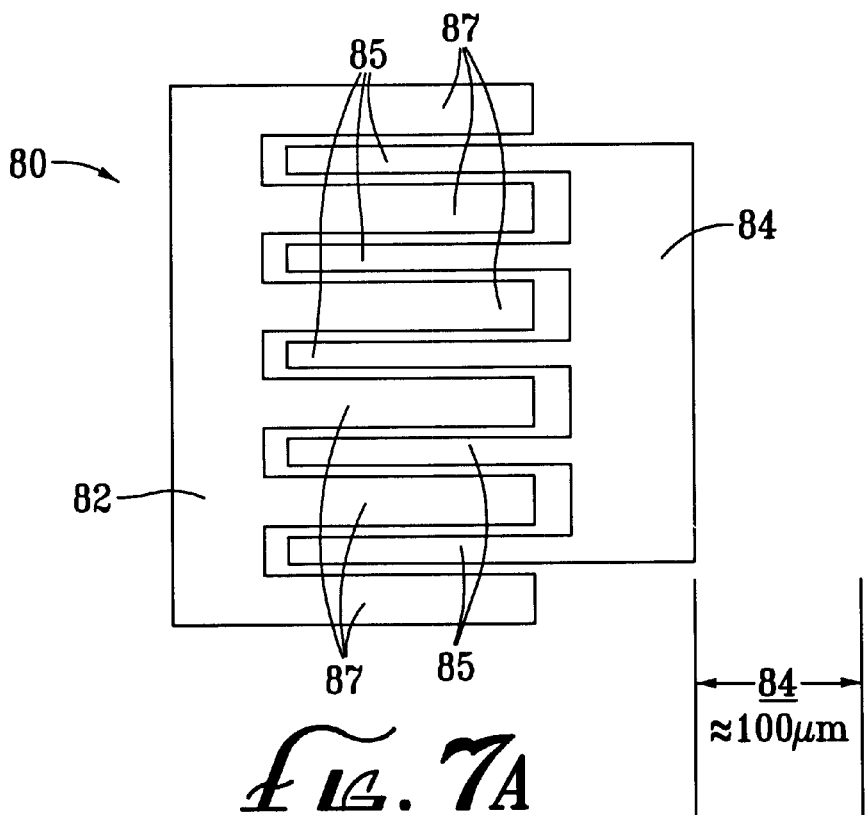
Figure 7B:
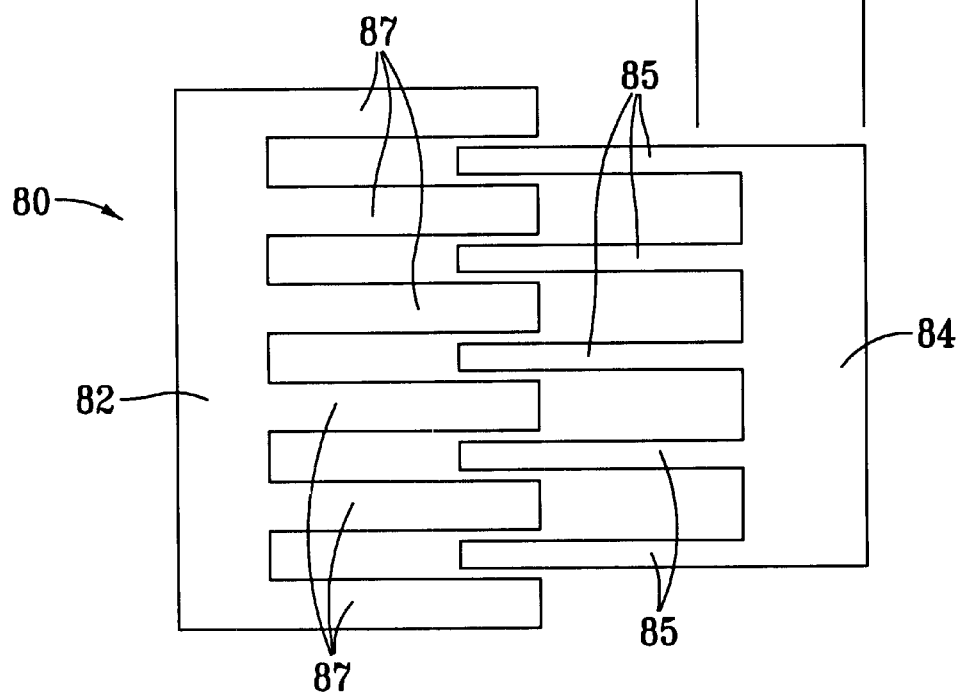

In the embodiment shown in FIG. 1, the micro-lens 10 of the scanner apparatus 20 is preferably mounted on a longitudinally adjustable base portion 30 which is adjustable from a first position relative to the light source 15 to a second position downstream from the first position. In a preferred embodiment, the base portion 30 may be adjustable using a micro-actuator such as a MEMS comb-drive 80 such as shown in FIGS. 7A and 7B. A suitable comb-drive actuator 80 may be manufactured and integrated into a silicon substrate such as substrate 30 as shown in FIG. 1. Generally, as shown in FIGS. 7A and 7B, a comb-drive actuator 80 includes interdigitated finger structures or "combs" 82 and 84 having fingers 85 and 87 which can be actuated by electrostatically exciting the resonance of polysilicon microstructures parallel to the plane of a silicon substrate such as a computer chip. The combs 82, 84 come in interdigitated pairs: one part, the stator 82, is generally physically anchored to the substrate 30 but isolated from it electrically with the lens attached directly to the corresponding comb 84.

In a comb-drive actuator 80 such as shown in FIGS. 7A and 7B, the displacement 84 between the combs 82, 84 is dependant on the applied voltage to the combs 82, 84. Control of this voltage gives precise control of the movement of these comb microstructures. A comb-drive mechanism 80 may also include linear plates (not shown) suspended by a folded-cantilever truss or torsional plates suspended by spiral or serpentine springs (not shown). These mechanisms are generally fabricated from a doped polysilicon film.

Accordingly, in such a lateral-drive approach embodied in a comb-drive actuator 80, a mechanical structure such as micro-lens 10 can be driven parallel to a substrate 40 by the comb-drive 80. For example, a voltage applied to the interdigited "combs" electrically excites the combs and causes lateral movement of one comb relative to the other comb of the pair. Thus, the fingers 85 and 87 and the combs slide laterally relative to each other. In this manner, the distance between the optical element (such as a micro-lens) and the light source is selectively varied depending on the magnitude of the voltage applied to the comb-drive. Further details of a comb-drive actuator suitable for use with a scanner are shown and described in U.S. Pat. No. 5,025,346, incorporated by reference herein in its entirety.

Although a comb-drive actuator 80 is particularly suited for application with a scanner system 20, it can be appreciated that a variety of micro-actuators may be used. For example, parallel plate capacitors may be used to generate a force transverse to the surface of a substrate 30. In a parallel plate capacitor, the transverse force created is proportional to the square of the drive voltage applied to the capacitors and inversely proportional to the square of the gap between the capacitor plates. However, the parallel plate capacitor may be limited in its application as the effective range of motion for parallel plate actuators is generally less than 10 microns. In contrast, comb-drive actuators 80 may be configured to have a range of motion in excess of 100 microns.

A scanner constructed with a micro-actuator may be advantageously incorporated into a substrate such as a silicon computer chip. In this regard, a comb-drive offers an extremely compact actuation mechanism that enables the scanner to be suitably miniaturized for mounting on a computer chip. Alternatively, the base portion 30 may also be adjusted using a hydraulic drive, a rotary drive, thermal expansion, or any combination of the above which can be made suitably compact to enable placement for miniaturized applications.

For example, a micro rotary drive suitable for use with the preferred embodiments is described in U.S. Pat. No. 4,435,667, incorporated by reference in its entirety. In such a drive mechanism, a coiled spring material operates in much the same way as a traditional bimetallic metal strip (although preferably in a much smaller scale) wherein a signal from a signal generator causes the coiled spiral drive to coil and uncoil. Alternatively, a thermal drive unit may be used wherein the varying thermal properties between two joined micro-structures is utilized such that thermal activation of the micro-structures results in bending or deflection in the micro-structures such that linear deflection is possible. These alternative mechanisms for longitudinally adjusting the base portion may be applied by one skilled in the art following the teachings herein and will not be discussed in great detail herein.

Through the use of the longitudinally adjustable base portion 30, a scanner may be configured to automatically adjust the focus of the resultant beam waist 25 in order to accommodate variously sized and positioned objects to be scanned. For example, as shown in FIG. 3, a scanner operates by focusing light emitted by a light source 15 through a micro-lens 10. The focussed light may be redirected by a fold mirror 12 or, alternatively, may be focussed directly to a scanning mirror 14. This scanning mirror will dither or reciprocate to produce a scanning beam 22 targeted on the object to be scanned 26. Alternatively, the scanning mirror may also be replaced by a hologram, prism, polygon mirror, or other suitable scanning means for creating a scanning beam 22.

Light reflected from the object to be scanned 26 is collected by a collection mirror or collection lens (not shown) which collects the reflected light and directs it to the photodetector 18. The photodetector 18 creates a signal based on the characteristics of the reflected light gathered from the object to be scanned 26 wherein the signal created is unique to the object to be scanned 26. In this manner, based on the signal created by the photodetector 18, information or data (e.g., price) previously stored regarding a particular object to be scanned can be accessed for that object.

Figure 4A:
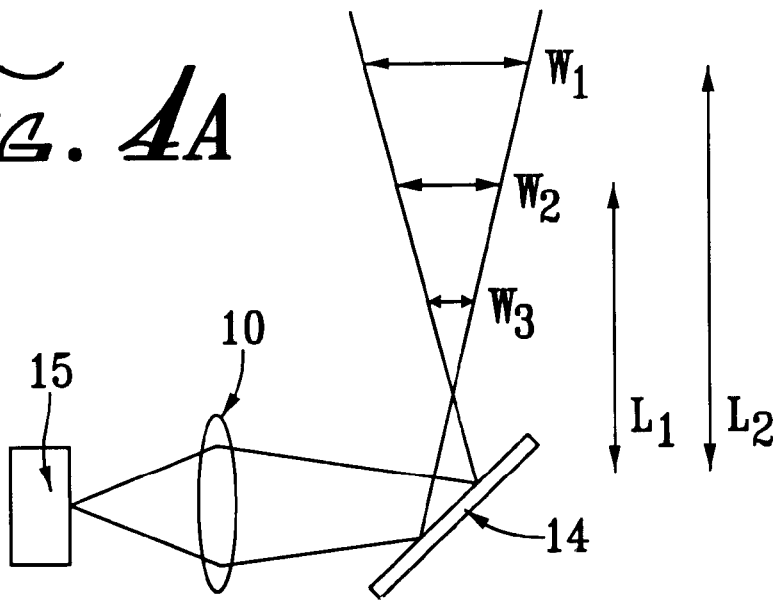

With scanners having a fixed focus, and consequently, a fixed field of view, the performance and accuracy of the scanner may be improved by positioning the object to be scanned at a specific distance from the scanner. The reason for this variation in performance is related to the size of the scanning beam at the object to be scanned. As shown in FIG. 4A, the farther from the scanner an object to be scanned is positioned, the wider will be the beam size 25 at that point. In FIG. 4A, the width of the beam $W_3$, is less than that of beam width $W_2$, which, in turn, is less than that of beam width $W_1$.

In some instances, it may be desirable to have a larger beam size 25 in order to improve the performance and accuracy of the scanner. For example, in a bar code scanning application wherein the barcode to be scanned is of poor quality, i.e. has substantial voids, blurring, or other defects, it is desirable to have a larger waist which will integrate over those areas of the barcode which are free of defects. Alternatively, for some barcode scanner applications, it may be desirable to have a narrow beam width 25 in order to read barcodes that are very small. Small barcodes are often used to reduce the cosmetic impact of the barcode or to allow the barcode to be placed in compact or unobtrusive locations. In such applications, a large scanning beam size would result in bringing in false reads or interference from the area surrounding the barcode, causing a decrease in the performance of the scanner and an increase in the incidence of false-reads and no-reads.

Figure 4B:
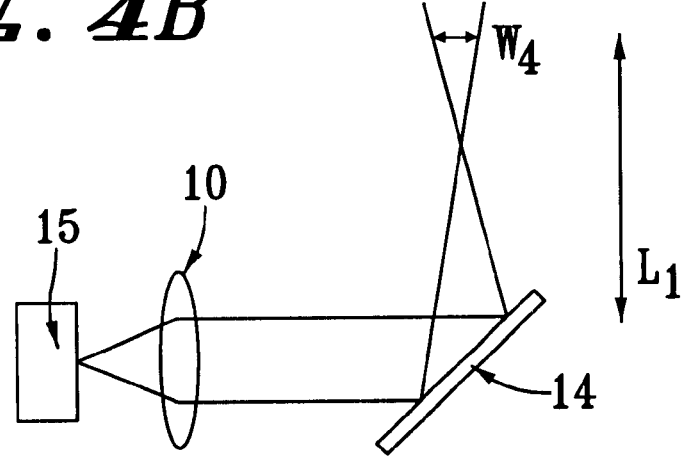

Accordingly, in a scanner 20, the micro-lens 10 is configured on a longitudinally adjustable base portion 30 which allows micro-adjustments of the micro-lens 10 in order to vary the beam size 25 in order to optimize the performance of the scanner. As shown in FIGS. 4A and 4B, the scanning beam width 25 will increase proportionally the farther downstream the scanning beam one moves (see, e.g., $W_1 > W_2 > W_3$ in FIG. 4A). However, the beam size may also be adjusted by changing the positioning of the micro-lens 10 relative to the light source 15. In FIG. 4B, the micro-lens 10 has been moved closer to light source 15 relative to its position in FIG. 4A. By moving the micro-lens 10 closer to the light source 15, the waist size is decreased for the same distance $L_1$ as between the configurations shown in FIGS. 4A and 4B. Specifically, the waist $W_4$ at length $L_1$ in FIG. 4B is narrower than waist $W_1$ also at length $L_1$ in FIG. 4A.

In a scanner 20, the micro-lens 10 may be configured and operatively positioned such that very small movements of the micro-lens 10 are required to adjust the resultant beam width 25. Specifically, in order to produce a scanner system suitable for use in extremely compact applications (e.g., pen scanner; wrist-mounted scanning devices) a micro-lens 10 may be configured and positioned such that an adjustment of <10 microns is required to alter the resultant beam width 25. As shown in FIG. 1, the micro-lens 10 is mounted extremely close to light source 15 such that the focus of the beam may be adjusted extremely quickly with very small movements of the longitudinally adjustable base portion 30. Accordingly, a scanner 20 may be made extremely compact while having a very fast focusing reaction time.

Figure 5:
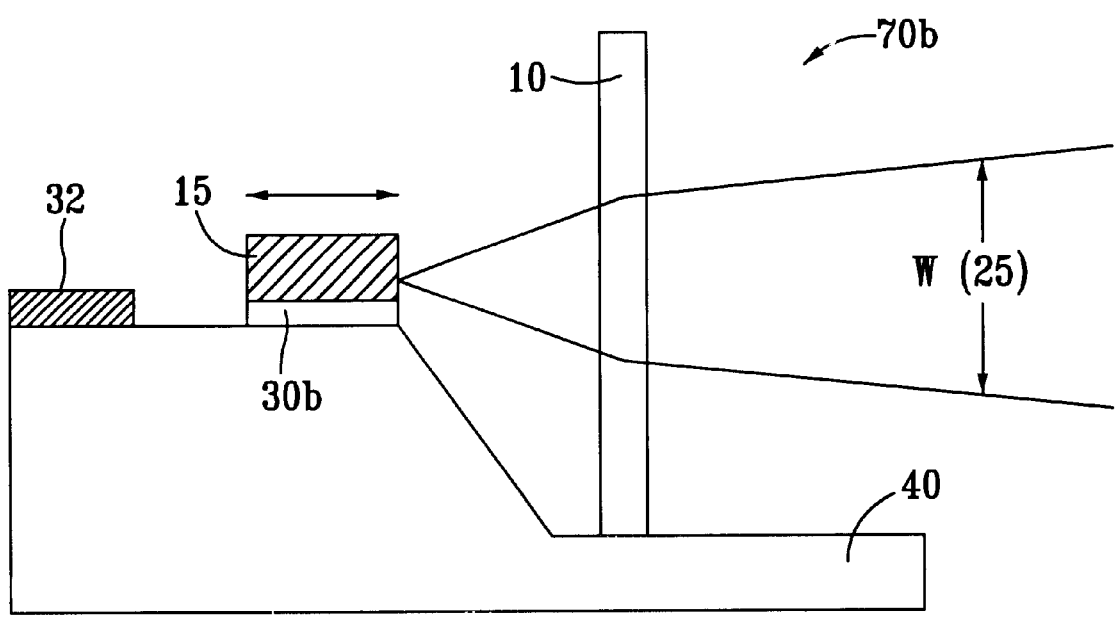
FIG. 5 illustrates an alternate embodiment of scanner system wherein relative movement of a light source, and a micro-lens is used to alter the waist size of a scanning beam.

As shown in FIG. 5, in an alternative embodiment, the light source 15 may be mounted to a longitudinally adjustable base portion 30b while the lens 10 remains fixed relative to the light source 15. In this manner, a scanner system 70b may be customized for alternative applications and configurations. Furthermore, both the light source 15 and the micro-lens 10 may be mounted to separate longitudinally adjustable base portions 30b and 30, respectively, in order cut the response time of the focusing system in half while doubling the length that the micro-lens 10 and light source 15 may be adjusted relative to each other.

In a preferred embodiment, the light source 15 and micro-lens 10 are mounted to a common substrate 40 such as a silicon wafer. As described above, a comb-drive mechanism or other micro-actuator can be integrated directly into the substrate to allow relative adjustment of the micro-lens 10, the light source 15, or both. A single substrate provides a compact and robust design which is shock and impact resistant and which can be integrated into the design of a chip for use with an electronic device. Alternatively, a device may utilize both first and second base substrates (not shown) where, for example, the micro-lens 10 is mounted to the first substrate while the light source 15 is mounted to the second substrate. In this embodiment, fabrication of the device is facilitated since the comb-drive or other micro-actuator, micro-lens 10, and first substrate are fabricated by a first process while the light source 15 and second substrate are fabricated by a second process.

Figure 2A:
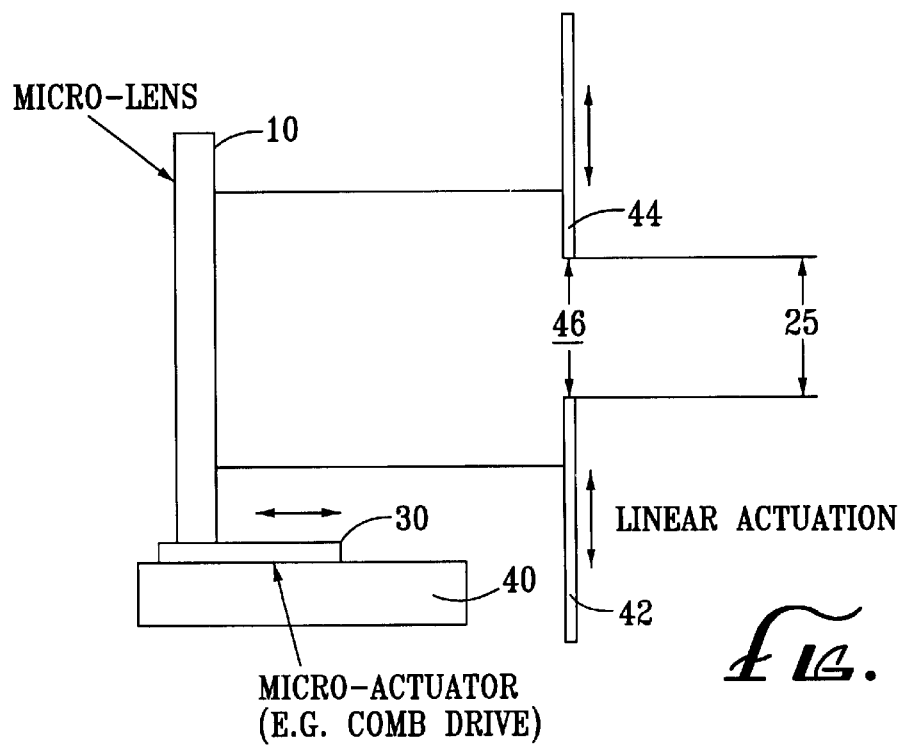

The width 25 of the scan beam may also be altered with an adjustable aperture configured to shape the scan: beam emitted from the light source 15. FIG. 2A shows such a configuration including first and second linearly adjustable walls 42, 44 that widen and narrow the aperture 46. In this manner, the waist 25 of the scan beam is consequently widened or narrowed by the mechanical operation of the first and second walls 42, 44. Alternatively, as shown FIG. 2B, the aperture 46 may be widened or narrowed by rotating the first and second walls 42, 44, relative to each other.

In order to optimize the performance of a scanner system 70b such as described above in connection with FIG. 5, a comb-drive 80 or other micro-actuator may be used to vary the relative spacing of the light source 15 and the micro-lens 10. Alternatively or additionally, the waist 25 of the scan beam may be controlled through linear or rotational manipulation of first and second walls 42, 44. However, in order to determine the appropriate waist size 25 desired for a specific application, in a preferred embodiment, the operation of which is graphically illustrated in FIG. 6A, a detector 110 is included for enabling the detection of the location and orientation of an object to be scanned.

In the scanning operation shown in FIG. 6A, a scanner device 20 is triggered which activates a detector 10 configured to collect detection information based on the location and orientation of an object to be scanned. For example, a proximity detector may be used to determine the distances and orientation of the object to be scanned. One such proximity detector is described in U.S. Pat. No. 5,495,077, issued to Miller, et. al., the disclosure of which is incorporated by reference in its entirety. Alternatively, an aiming beam may be employed to facilitate the proper aiming of the scanner relative to the object to be scanned. This aiming beam typically comprises a quick burst of visible light that indicates to the operator whether the scanner is correctly positioned to read the appropriate location (e.g., the barcode) on an object to be scanned. One such laser light transmitter and proximity detector is described in U.S. Pat. No. 5,424,717, issued to Platt, et. al., the disclosure of which is incorporated by reference in its entirety. In a preferred application, an aiming beam may be configured such that reflected light from the aiming beam may be detected and utilized for determining the distance and orientation of the object to be scanned. In any event, one skilled in the art can practice the disclosed systems with a variety of detectors that are suited for this function.

As shown in the embodiment of FIG. 6A, this detection information collected by the detector 110 is sent to a processor 120 (for example, a microprocessor) which calculates actuation information based at least in part on the detection information received, which the processor 120 then sends to micro-actuators 130 in order to adjust the relative spacing of the micro-lens 10 and the light source 15. For example, the processor 120 may translate the detection information into a voltage signal, wherein the voltage signal will be sent to the micro-actuator 130 which then activates to the corresponding position. In a preferred application, a scanner device 20 may be constructed without a processor 120 wherein the detector 110 is configured such that detection information may be sent directly to the micro-actuator(s) 130 to be used as actuation information. For example, the detection information can be configured as a voltage signal that is read by the micro-actuator(s) 130 as actuation information.

Once the micro-actuator(s) 130 receive the actuation information from the processor 120, they are actuated to adjust the relative spacing of the micro-lens 10 and the light source 15 in order to appropriately adjust the beam width of the scanning beam for the particular location and orientation of the object to be scanned. In the example discussed in the paragraph above, the magnitude of the voltage received from either the processor 120 or, in the case wherein the scanner 20 does not include a processor 120, from the detector 110 would be proportional to the resultant change in separation between the micro-lens 10 and light source 15.

After the micro-actuator(s) 130 have optimized the beam width of the scan beam for the particular location and orientation of the object to be scanned, the scanner 20 then scans the object to be scanned and creates a unique scan signal based on the reflected light from the scanned object. This scan signal may then be used, for example, to access previously stored information regarding the scanned object.

The flow chart FIG. 6B shows an alternate embodiment wherein the scanner 20 is configured with an optimization feedback loop. Specifically, the object is scanned with a scanning beam as herein described and a scan signal is created based on light reflected from the scanned object. This signal is sent to a processor 120 wherein the processor 120 compares the scan signal to a set value or to a previously obtained and stored scan signal to determine whether the signal is of sufficient quality to produce an optimum result. If the signal is of appropriate quality, the scan signal may then be used as an "optimum" scan signal, for example, to access previously stored information regarding the scanned object. Alternatively, it may be necessary for the scanner 20 to repeat the scan of the object with the relative spacing of the micro-lens 10 and the light source 15 set at the spacing corresponding to the optimum scan signal.

Moreover, the processor 120 may be programmed so that if the scan signal does not meet a "minimum" scan signal standard programmed into the processor 120 (e.g., has too much signal "noise") then the processor creates new actuation information which is sent to the micro-actuator(s) 130, as discussed above. Following actuation of the micro-actuator(s) 130 to alter the waist size of the scan beam, the object is scanned again and a second scan signal is created. The above process is repeated with the second scan signal, and so on, until a final scan signal of the appropriate quality is created which may then be used to access information regarding the scanned object.

Alternatively, signal scan values may be obtained for the whole range of relative spacings between the micro-lens 10 and the light source 15. The processor 120 can be programmed to either choose the optimum scan signal from the signal values obtained over the range of waist sizes sampled (1) and either use the optimum scan signal to access information regarding the scanned object or (2) choose the relative spacing between the micro-lens 10 and the light source 15 corresponding to the optimal scan signal value and scan the object at that optimized setting. For alternative (2), the resultant scan signal would then be used to access information regarding the scanned object.

In an alternative embodiment, the operator may manually set the relative spacing between the micro-lens 10 and the light source 15. In such a configuration, the relative spacing may be adjusted manually, either by the OEM when the scanner device 20 is manufactured or by a user in the field. For example, the OEM or the user may alter the focus parameters of the scanner device 20 for variously sized and positioned objects to be scanned. In such case, as shown in FIG. 6A, the "detector" 110 is actually the user or OEM who inputs the detection information in the form of the focus parameters input into the scanner device 20. This alternative embodiment offers a relatively simple and robust design that can be modified for a variety of applications in order to tailor the performance of the scanner 20 to the particularities of the application for which it is intended.

A user- or OEM-adjustable configuration is particularly useful in that it allows a single scanner configuration to be tailored for specific applications. For example, the scanner may be programmed by either the user or the OEM to transmit a small waist scanning beam which is appropriate for reading small barcode labels. Alternatively, if the device is to be used on larger applications wherein the print quality of the barcode to be read is low, the device may be configured to have a large waist size which integrates over voids, blurring, and other defects in the barcode label.

A micro-optical system for use with a scanner system having an adjustable-waist scanning beam has been herein shown and described. From the foregoing, it will be appreciated that although preferred embodiments have been described herein for purposes of illustration, various modifications may be made without deviating from the spirit of the invention. Thus, the present invention is not limited to the embodiments described herein, but rather is defined by the claims that follow.

I claim:

1. A scanner system comprising:

a light source;

a micro-optical element; positioned adjacent the light source, the light source and micro-optical element having an initial relative spacing, the micro-optical element disposed such that light emitted from the light source is incident the micro-optical element;

a detector configured to provide detection information based at least in part on a location of an object to be scanned relative to the scanner system;

a processor configured to receive the detection information from the detector and to calculate actuation information based on the detection information received, the processor further configured to transmit the actuation information; and an actuator configured to receive the actuation information from the processor and to adjust the initial relative spacing of the micro-optical element and the light source based at least in part on the actuation information received.

2. The system of claim 1 wherein the detector comprises a light beam and a photodetector.

3. The system of claim 1 wherein the detector comprises a user-adjustable setting having settings corresponding to an anticipated location of an object to be scanned.

4. The system of claim 1 wherein the actuator comprises a comb-drive.

5. The system of claim 1 further comprising a light aperture positioned upstream of the micro-optical element, the light aperture adjustable from a first size to a second size.

6. The system of claim 5 wherein the light aperture is linearly adjustable from a first size to a second size.

7. The system of claim 5 wherein the light aperture is rotatably adjustable from a first size to a second size.

8. The system of claim 1 wherein the detector is configured to sample a scan signal created by the light emitted from the light source and reflected from an object to be scanned, the detector further configured and to create detection information based on one or more characteristics of the scan signal sampled.

9. The system of claim 1 wherein the micro-optical element is fixed relative to the light source and the light source is linearly adjustable by the actuator, wherein the actuator comprises a comb-drive micro-actuator.

10. The system of claim 1 wherein the light source is fixed relative to the micro-optical element and the micro-optical element is linearly adjustable by the actuator, wherein the actuator comprises a comb-drive micro-actuator.

11. The system of claim 1 wherein the micro-optical element comprises a curved micro-mirror.

12. The system of claim 1 wherein the micro-optical element comprises a micro-holographic element.

13. A scanner system comprising:

a base portion;

a light source mounted on the base portion;

a micro-optical element source positioned adjacent the light source, the light source disposed such that light emitted from the light source is incident the micro-optical element, wherein the light source and micro-optical element having a relative spacing;

a detector configured to provide detection information based at least in part on a location of an object to be scanned relative to the scanner system; and an actuator configured to receive the detection information from the detector and to adjust the relative spacing of the micro-optical element and the light source based at least in part on the detection information received.

14. The system of claim 13 wherein the detector comprises a user-adjustable setting having settings corresponding to an anticipated location of an object to be scanned.

15. The system of claim 13 wherein the detector comprises a light detector configured to detect reflected light from the object to be scanned and to produce detection information based on the reflected light.

16. The system of claim 13 wherein the actuator comprises a comb-drive.

17. The system of claim 13 further comprising a light aperture positioned upstream of the micro-optical element, the light aperture being adjustable from a first size to a second size.

18. The system of claim 13 wherein the detector is configured to sample a scan signal created by the light emitted from the light source and reflected from an object to be scanned, the detector further configured to create detection information based on one or more characteristics of the scan signal sampled.

19. The system of claim 13 wherein the micro-optical element is fixed relative to the light source and the light source is linearly adjustable by the actuator, wherein the actuator comprises a comb-drive micro-actuator.

20. The system of claim 13 wherein the light source is fixed relative to the micro-optical element and the micro-optical element is linearly adjustable by the actuator, wherein the actuator comprises a comb-drive micro-actuator.

21. The system of claim 13 wherein the micro-optical element comprises a curved micro-mirror.

22. The system of claim 13 wherein the micro-optical element comprises a micro-holographic element.

23. The system of claim 13 wherein the light aperture is linearly adjustable from a first size to a second size.

24. The system of claim 13 wherein the light aperture is rotatably adjustable from a first size to a second size.

25. A method for optimizing the size of a scanning beam in a scanner system, the method comprising the steps of:

(a) providing a scanner system comprising a light source, a micro-optical element, and at least one micro-actuator, wherein the micro-optical element and the light source have an initial relative spacing, (b) collecting detection information on an object to be scanned, wherein said detection information is based at least in part on a location of the object to be scanned;

(c) creating actuation information based at least in part on the detection information;

(d) sending the actuation information to the at least one micro-actuator, wherein the at least one micro-actuator controls the relative spacing of the micro-optical element and the light source; and (e) adjusting the initial relative spacing of the micro-optical element and the light source with the at least one micro-actuator based at least in part of the actuation information received.

26. The method of claim 25 wherein the scanner system includes a photodetector, the method including the additional steps of
(f) activating the light source such that light radiated therefrom falls incident the micro-optical element and is directed onto an object to be scanned;
(g) collecting light reflected from the object to be scanned with the photodetector;
(h) creating a scan signal based at least in part on the characteristics of the reflected light collected by the photodetector; and
(i) accessing information regarding the scanned object based at least in part on the scan signal.

27. The method of claim 25 wherein the at least one micro-actuator comprises at least one comb-drive micro-actuator, wherein step (e) comprises adjusting the initial relative spacing of the micro-optical element and the light source with the at least one comb-drive micro-actuator based at least in part of the actuation information received.

28. The method of claim 25 wherein the step of collecting detection information on an object to be scanned comprises user-inputting detection parameters based on the anticipated location of an object to be scanned.

29. The method of claim 25 wherein the micro-optical element is comprised of one or more optical elements selected from the group consisting of: spherical, Fresnel and aspheric lenses or mirrors, holographic optical elements, and combinations thereof.

30. The method of claim 25 wherein the micro-optical element comprises a micro-lens.

31. A method for optimizing the size of a scanning beam in a scanner system, the method comprising the steps of:
(a) providing a scanner system comprising a light source, a micro-optical element, a photodetector, and at least one micro-actuator, wherein the micro-optical element and the light source have an initial relative spacing,
(b) activating the light source such that light radiated therefrom falls incident the micro-optical element and is directed onto an object to be scanned;
(c) collecting reflected light from the object to be scanned with the photodetector;
(d) creating a first scan signal based at least in part on one or more characteristics of the reflected light collected by the photodetector;
(e) assigning a signal quality to the first scan signal;
(f) adjusting the initial relative spacing of the micro-optical element and the light source to an adjusted relative spacing using the at least one micro-actuator based at least in part on the one or more characteristics of the reflected light collected;
(g) repeating steps (a–b) to create a second scan signal based at least in part on the characteristics of the reflected light collected by the photodetector;
(h) assigning a signal quality to the second scan signal;
(i) comparing the signal quality of the first scan signal and the signal quality of the second scan signal; and
(j) choosing an optimum scan signal, wherein the optimum scan signal is the signal chosen from the first scan signal and the second scan signal having a better signal quality.

32. The method of claim 31 including the additional steps of:

(k) adjusting the spacing of the micro-optical element and the light source to the adjusted relative spacing setting corresponding to the optimum scan signal;
(l) activating the light source such that light radiated therefrom falls incident the micro-optical element and is directed onto an object to be scanned;
(m) collecting reflected light from the object to be scanned with the photodetector;
(n) creating a third scan signal based at least in part on the characteristics of the reflected light collected by the photodetector; and
(o) accessing information regarding the scanned object based at least in part on the third scan signal.

33. The method of claim 31 including the additional step of:
(p) accessing information regarding the scanned object based at least in part on the optimum scan signal.

34. The method of claim 31 wherein steps (a–j) are repeated to create a plurality of scan signals, each scan signal corresponding to a unique adjusted relative spacing between the micro-optical element and the light source, wherein the optimum scan signal corresponds to the scan signal chosen from the plurality of scan signal having a best signal.

35. The method of claim 31 wherein the micro-optical element is comprised of one or more optical elements selected from the group consisting of: spherical, Fresnel and aspheric lenses or mirrors, holographic optical elements, and combinations thereof.

36. The method of claim 31 wherein the micro-optical element comprises a micro-lens.

37. The method of claim 31 wherein the step of adjusting the initial spacing of the micro-optical element and the light source comprises moving the micro-optical element with the micro-actuator.

38. A method for optimizing the size of a scanning beam in a scanner system, the method comprising the steps of:
(a) providing a scanner system comprising a light source, a micro-optical element, a photodetector, and at least one micro-actuator, wherein the micro-optical element and the light source have an initial relative spacing,
(b) activating the light source such that light radiated therefrom falls incident the micro-optical element and is directed onto an object to be scanned;
(c) collecting reflected light from the object to be scanned with the photodetector;
(d) creating a first scan signal based at least in part on one or more characteristics of the reflected light collected by the photodetector;
(e) assigning a signal quality to the first scan signal;
(f) adjusting the initial relative spacing of the micro-optical element and the light source to an adjusted relative spacing using the at least one micro-actuator based at least in part on the. one or more characteristics of the reflected light collected;
(g) repeating steps (a–b) to create a second scan signal based at least in part on the characteristics of the reflected light collected by the photodetector;
(h) assigning a signal quality to the second scan signal;
(i) comparing the signal quality of the first scan signal and the signal quality of the second scan signal; and
(j) choosing an optimum scan signal, wherein the optimum scan signal is the signal chosen from the first scan signal and the second scan signal having a better signal quality, wherein the at least one micro-actuator comprises at least one comb-drive micro-actuator, wherein step (f) comprises adjusting the initial relative spacing of the micro-optical element and the light source with the at least one comb-drive micro-actuator based at least in part of the actuation information received.

39. A method for optimizing the size of a scanning beam in a scanner system, the method comprising the steps of:

(a) providing a scanner system comprising a light source, a micro-optical element, a photodetector, and at least one micro-actuator, wherein the micro-optical element and the light source have an initial relative spacing, (b) activating the light source such that light radiated therefrom falls incident the micro-optical element and is directed onto an object to be scanned;

(c) collecting reflected light from the object to be scanned with the photodetector;

(d) adjusting the initial relative spacing of the micro-optical element and the light source to an adjusted relative spacing using the at least one micro-actuator based at least in part on the one or more characteristics of the reflected light collected, wherein the at least one micro-actuator comprises at least one comb-drive micro-actuator, wherein step (d) comprises adjusting the initial relative spacing of the micro-optical element and the light source with the at least one comb-drive micro-actuator based at least in part of the actuation information received.

* * * * *

UNITED STATES PATENT AND TRADEMARK OFFICE
CERTIFICATE OF CORRECTION

PATENT NO. : 6,522,441 B1  Page 1 of 1
DATED : February 18, 2003
INVENTOR(S) : Robert W. Rudeen It is certified that error appears in the above-identified patent and that said Letters Patent is hereby corrected as shown below:

Title page,
Item [57], ABSTRACT,
Line 11, "n part" should read -- in part --.

Column 2,
Line 46, "where-space" should read -- where space --.

Column 4,
Line 6, "30" should read -- 40 --.

Column 6,
Line 57, "scan:" should read -- scan --.

Column 7,
Line 11, "detector 10" should read -- detector 110 --.

Column 12,
Line 55, "the. one" should read -- the one --.

Signed and Sealed this

Twenty-third Day of March, 2004

JON W. DUDAS
*Acting Director of the United States Patent and Trademark Office*